United States Patent [19]
Niknafs

[11] Patent Number: 5,747,143
[45] Date of Patent: May 5, 1998

[54] PACKING ELEMENT

[75] Inventor: Hassan Niknafs, Stow, Ohio

[73] Assignee: Norton Chemical Process Products Corporation, Stow, Ohio

[21] Appl. No.: 676,756

[22] Filed: Jul. 8, 1996

[51] Int. Cl.⁶ .............................. B32B 1/00; B01D 47/16
[52] U.S. Cl. .................... 428/174; 428/156; 428/131; 428/192; 261/94; 261/DIG. 72; 210/150
[58] Field of Search ...................... 428/156, 172, 428/192, 131, 174, 357, 397; 261/94, DIG. 72, 113; 210/150

[56] References Cited

U.S. PATENT DOCUMENTS

| | | | |
|---|---|---|---|
| 659,266 | 10/1900 | Stewart | 428/182 |
| 3,535,746 | 10/1970 | Thomas | 24/256 |
| 5,215,806 | 6/1993 | Bailey | 428/182 |

Primary Examiner—Donald Loney
Attorney, Agent, or Firm—David Bennett

[57] ABSTRACT

The invention provides novel mass transfer elements with a corrugated body structure and having ends turned back in a direction opposed to the curves of the corrugations such that the ends are turned towards one another. These elements are particularly effective as random dumped packing for mass transfer towers, providing a combination of high surface area and low pressure drop.

6 Claims, 1 Drawing Sheet

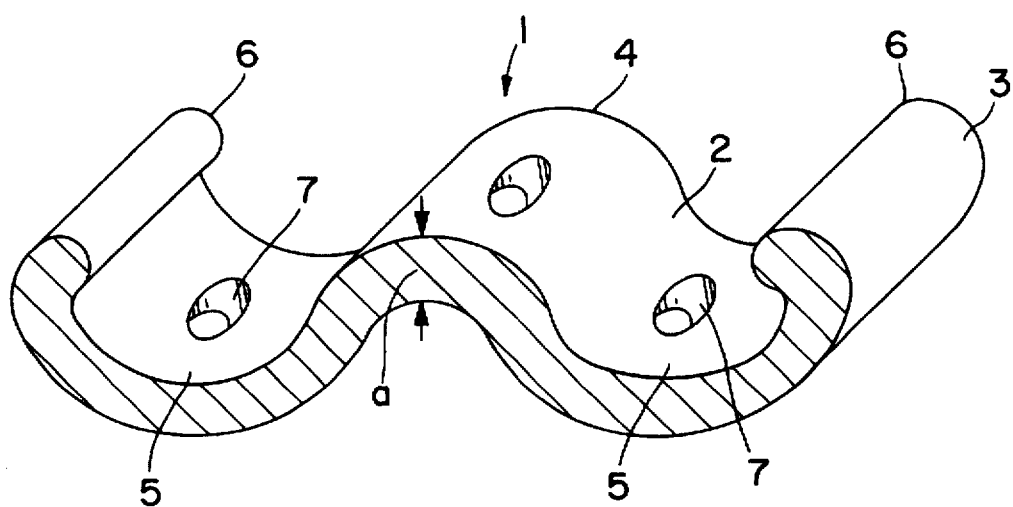
FIG. I

PACKING ELEMENT

BACKGROUND OF THE INVENTION

This invention relates to packing elements for use in chemical process equipment. It relates specifically to random packing elements of a novel and advantageous design useful in mass transfer applications.

"Mass transfer" has been defined as the transfer of one or more components from one immiscible phase to another. This "component" may be a chemical or it may be heat. In the case in which the component is heat this may be combustion heat or reaction heat that needs to be removed from a reaction stream before further processing, or from a hot stream of fluid before it can be collected or used. The component can also be a chemical such as a gas component to be removed from a gas stream by absorption, or a component of a liquid mixture to be treated by a distillation or separation process. For such applications and a plurality of other applications involving mass transfer, it is conventional to pass the fluid to be treated through a column containing randomly disposed packing elements. These elements are hereinafter referred to as mass transfer elements for simplicity, regardless of the actual process in connection with which they are actually designed to be used.

Clearly the most efficient mass transfer elements are those that present the largest surface area to the fluid for contact or usable surface area. There have therefore been many attempts to design random packing elements with this surface area feature maximized. It is found however in practice that other characteristics are also extremely desirable. For example, it is also valuable if the elements do not nest together when in the column because this reduces the effective surface area exposure. It is also important that the elements do not pack so tightly as to restrict the fluid flow and generate a large pressure drop between the entrance and exit of the column.

The balancing of these often competing requirements to produce an effective mass transfer element is a matter of considerable skill and involves compromises to achieve the optimum combination of properties.

DESCRIPTION OF THE INVENTION

A new design for a random packing mass transfer element has now been discovered that produces a very advantageous balance of desirable properties.

The mass transfer element of the invention comprises first and second, generally parallel, opposed major surfaces with length and breadth dimensions, said element being deformed along parallel axes in the breadth dimension so as to provide, with respect to the first major surface, at least one convexity intermediate between the ends of the length dimension and a pair of opposed concavities adjacent the ends of the length dimension such that opposed ends of the body face generally towards one another.

In the simplest form the element has a uniform thickness and a uniform cross-section taken in the length direction that has the general shape of the number 3.

The cross-section along the length direction can vary along the length so as to make the element thicker at either the ends or in the middle portion or to vary in any other desired fashion. Variations in thickness of up to about 50% can be tolerated without departing from the provision that the element has first and second surfaces that are "generally parallel" as the term is to be interpreted herein. Usually however a uniform cross-section is preferred to ensure equal strength at all points and greater ease of manufacture. The permitted variation also include the provision of a "rippled" surface for the first and second major surfaces. These "ripples" increase the surface area of the body without significantly changing the overall dimensions and are very much smaller than the concavities and convexities which form characterizing features of the present invention.

The length on the element can vary across the breadth direction so as to provide for example a "waisted" portion or a degree of tapering towards the ends. Often it is advantageous to provide a scalloped edge to the body along either or both of the length and breadth directions such that these dimensions can vary constantly.

The extent of the convexity in the first major surface, which in preferred cases is mirrored by a corresponding concavity on the opposed second major surface, is preferably such that the smallest radius of curvature on the convexity is greater than the thickness of the element. However it is also possible that the convexity is in the form of a ridge line across the breadth of the element in which case the height of the ridge should preferably be greater than the thickness of the element.

The concavities at the ends of the element preferably are symmetrical in terms of dimensions and location. The radii of curvature of the concavities are preferably too small to accommodate the end of a similar element. This may be for example because the element has ends with enlarged thickness, (for example a beaded end shape), such that they are too large to fit within the concavity or that the concavity is too small to accommodate the thickness of the end of a second element even without such increased end thickness.

The concavities should also preferably be sufficiently pronounced that the each end is bent through an angle of at least 150° and more preferably at least 180°.

The objective of these design variations is to ensure that the elements are not able to "nest" together in a fashion that would create increased local pressure drop, while at the same time maximizing the surface area exposed and available to perform mass transfer functions.

A further desirable feature is the provision of holes piercing the element and connecting the first and second major surfaces. The holes have the function of increasing the flow capacity without sacrificing efficiency or leading to increased pressure drop. Each element is preferably provided with at least one such hole but three or even more are preferred provided that these do not compromise the ability of the element to withstand the conditions under which it is to be used. Often the elements are dumped into a tower reactor in a layer several meters in thickness. This can lead to considerable pressure on the elements at the bottom of the tower as a result of the weight of those above. Thus the element preferably has as many holes as the element thickness, the hole dimensions and the desired application permit, consistent with the above considerations.

The location of the holes is preferably in the region of maximum concavity or convexity. Thus, whatever the orientation of the element in a tower, liquids contacting a major surface and running across such surface to the lowest point thereof will pass over an edge or down a hole rather than collect in a pool.

The element can be formed of any of the materials from which mass transfer elements are typically formed. These include metal, plastic and ceramic. Generally the application determines to some extent the material that is to be used.

DRAWING

FIG. 1 is a perspective view of a mass transfer element according to the invention. In the drawing, the element, 1, has first and second major surfaces, 2 and 3 respectively, and a thickness, "a". At about the midpoint of the element there is a convexity, 4, in the first major surface, and a corresponding concavity in the second major surface. Adjacent the opposed ends of the element there are concavities, 5, formed in the first major surface of the element so as to cause the ends, 6, to be turned back through 180° so as to face towards each other. In the body of the element there are provided holes, 7, which communicate between the opposed major surfaces and are located at the points of greatest curvature of the concavities and the convexity.

The element is preferably made by extruding a ceramic material through a die having the shape of the cross-sectional shape of the element but a molding process can readily be devised to produce the same shapes. Certain optional design variations within the scope of this invention however can only be produced from a plastic or ceramic material using a molding process. Elements made from metal are most frequently made by a process that includes stamping out an appropriate shape and then deforming the stamped out shape to the appropriate configuration.

What is claimed is:

1. A mass transfer element having first and second, generally parallel, opposed major surfaces with length and breadth dimensions with said surfaces being separated by a thickness dimension, said element being deformed along parallel axes in the breadth dimension so as to provide, with respect to the first major surface, at least one convexity intermediate between and equidistant from the ends of the length dimension and an identical pair of opposed concavities adjacent the ends of the length dimension such that opposed ends of the element face generally towards one another and the radius of curvature of each concavity is smaller than the thickness dimension of the element at the ends of the length dimension.

2. An element according to claim 1 in which the element has one convexity in the first major surface and a corresponding concavity in the second major surface and the smallest radius of curvature of the convexity is greater than the greatest separation between the first and second major surfaces.

3. An element according to claim 1 in which the opposed ends of the length of the first major surface have concavities formed by bending the ends of the element through at least 150° till they face generally towards one another.

4. An element according to claim 1 in which the first and second major surfaces are connected by holes in the body of the element.

5. An element according to claim 1 in which at least one of the first and second major surfaces is rippled.

6. An element according to claim 1 which is formed from a ceramic.

* * * * *